March 5, 1957 W. L. HURFORD 2,784,247

INDICATOR FOR TELEVISION IMAGES

Filed April 10, 1951 2 Sheets-Sheet 1

Inventor:
Winslow L. Hurford,
by
His Attorney.

March 5, 1957 W. L. HURFORD 2,784,247

INDICATOR FOR TELEVISION IMAGES

Filed April 10, 1951 2 Sheets-Sheet 2

Inventor:
Winslow L. Hurford,
by Merton D. Morse
His Attorney.

2,784,247

INDICATOR FOR TELEVISION IMAGES

Winslow L. Hurford, North Syracuse, N. Y., assignor to General Electric Company, a corporation of New York Application April 10, 1951, Serial No. 220,243
3 Claims. (Cl. 178—5.8)

The present invention relates in general to television systems and in particular relates to means for supplying a marker signal into a television channel carrying the usual television picture signal whereby a movable identification marker is produced on the reproduced television image.

In televising certain kinds of programs, for example sports events, it is often quite desirable and necessary for the commentator to be able to readily identify and point out during his commentary the items of interest in a televised picture. The present invention is particularly addressed to the provision of an electronic means for introducing an identification marker in the reproduced television image for purposes of the above character.

An object of the present invention is to provide improved means for televising programs.

It is also an object of the present invention to provide improvements in television systems.

It is a further object of the present invention to provide a system for the introduction of an identification marker into a television picture.

It is still a further object of the present invention to provide circuits for inserting an identification signal into a television signal whereby an indication is produced on the television image formed from the television signal.

Another object of the present invention is to provide a means for electronically introducing the identification signal at a location which may be at a great distance from the original scene and its associated camera equipment and to provide means for accurately positioning the identification signal in a television raster with respect to the object or person to be identified.

Figure 1:
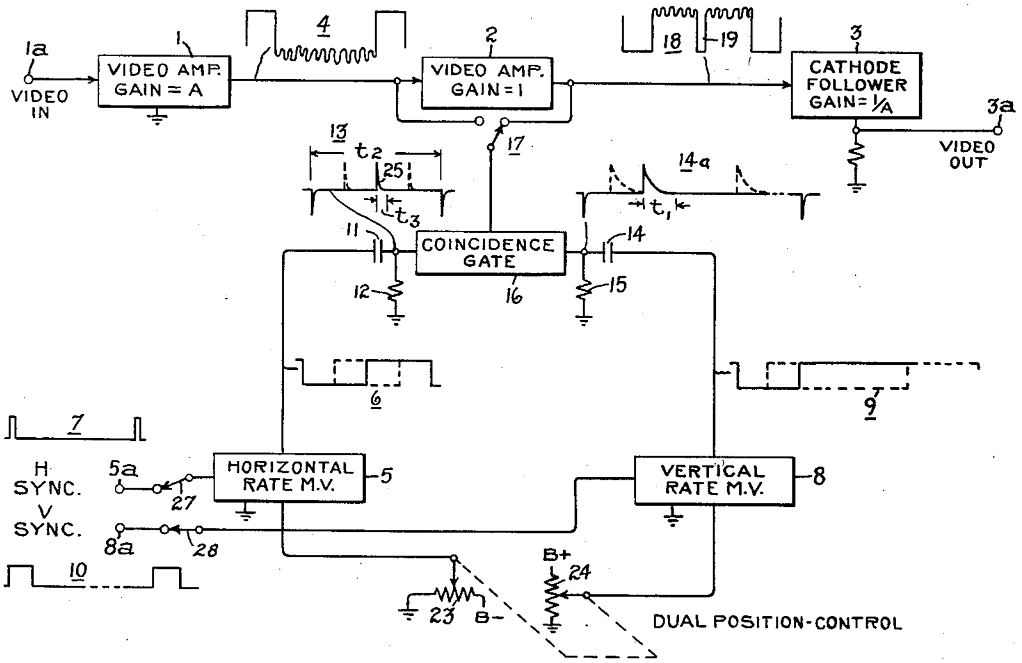
Figure 2A:
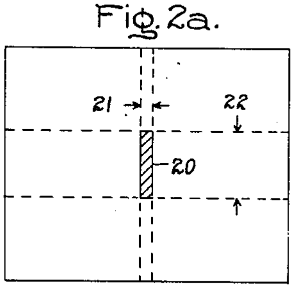
Figure 2C:
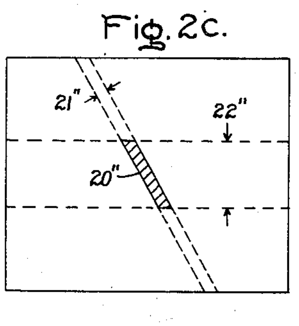
Figure 2B:
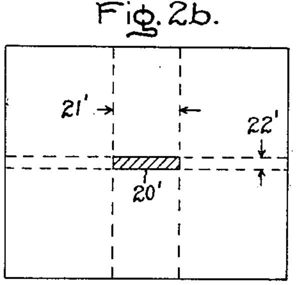
Figure 3:
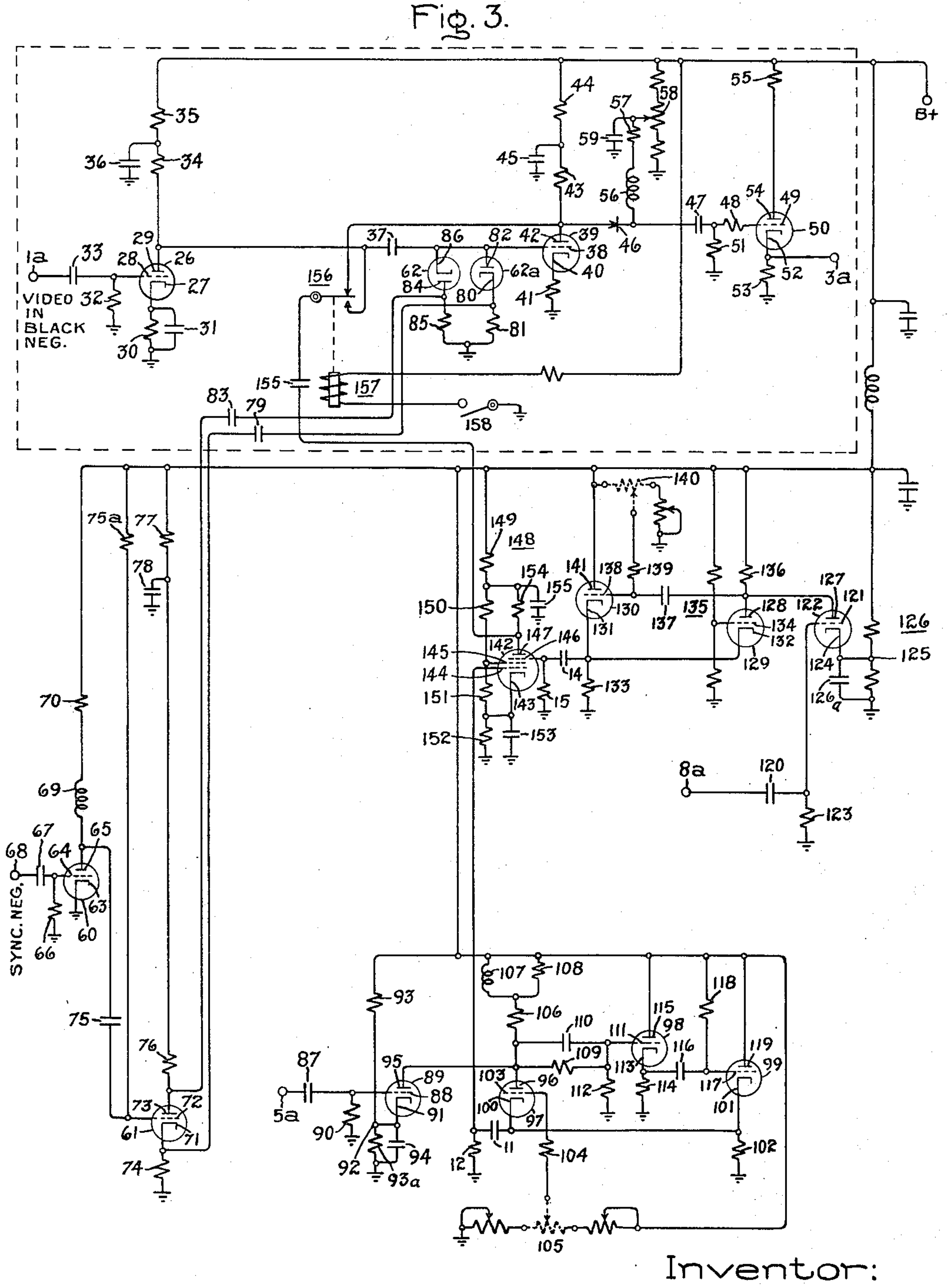

The novel features which I believe to be characteristic of my invention are set forth with particularity in the appended claims. My invention, however, both as to its organization and method of operation, together with further objects and advantages thereof may best be understood by reference to the following description taken in connection with the accompanying drawings in which Fig. 1 is a block diagram of an embodiment of my invention; Figs. 2*a*, 2*b* and 2*c* represent diagrams useful in explaining the operation of the invention. Fig. 3 is a schematic diagram of the embodiment of my invention shown in the block diagram of Fig. 1.

Referring now to the block or line diagram of Fig. 1, blocks 1, 2, and 3 in the upper portion of the figure represent respectively a first amplifier, a second amplifier and a cathode follower stage connected in cascade in that order. Television signals produced by the line by line and the field by field scansion of an image to be televised are applied between terminal 1*a* and ground of this channel. The graph 4 adjacent the aforementioned channel represents the signal produced during the scansion of a single line of the above-referred-to image. The television signals modified by the other elements of the system of Fig. 1 in a manner to be hereinafter described appear between output terminal 3*a* and ground. Graph 18 adjacent cathode follower 3 shows a single line of this modified signal. The modified signal is the signal which is used to modulate a television transmitter and is the signal which is detected at a television receiver.

The block 5 represents a source of substantially square waves synchronized with the aforementioned line by line scanning by a horizontal line synchronizing signal. The graph 6 adjacent block 5 represents a cycle of the wave produced by generator 5. The two dotted portions of the graph 6 represent changes in this wave produced by moving the control arm of potentiometer 23 connected to generator 5 to a position on one side of and to a position on the other side of a central position, respectively. The graph 7 adjacent block 5 represents the portion of the horizontal synchronizing signal located immediately preceding and following a single line of the video portion of the television signal and is applied between terminal 5*a* and ground. Terminal 5*a* is connected to generator 5 through switch 27.

The block 8 represents a generator of substantially square waves synchronized with the aforementioned field by field scanning by a vertical synchronizing signal. The graph 9 adjacent block 8 represents a cycle of the wave produced by generator 8. The two dotted portions of the graph 9 represent changes in this wave produced by moving the control arm of potentiometer 24 connected to generator 8 to a position above and below, respectively, of a central control position. The graph 10 adjacent graph 7 represents the portion of the vertical synchronizing signal located immediately preceding and following a single field of the television signal and is applied between terminal 8*a* and ground. Terminal 8*a* is connected to generator 8 through switch 28.

The signal from the generator 5 is applied to a differentiating network comprising a series combination of capacitance 11 and resistance 12 to develop across the resistance 12 the signal represented by the graph 13. Similarly, the output from the generator 8 is applied to a second series combination of capacitance 14 and resistance 15 to develop across the resistance 15 the waveform represented by the graph 14*a*. The time constant of the series combination of capacitance 14 and resistance 15 is made substantially larger than the time constant of the series combination comprising capacitance 11 and resistance 12 so that the duration represented by $t_1$ on the graph 14a is substantially larger than the duration $t_2$ corresponding to the duration of a line of the television signal. For reasons of clarity, the abscissa of graph 14 is drawn to different time scale than the abscissa of graph 13. Accordingly, the interval $t_1$ on graph 14*a* may be considerably longer than the interval $t_2$ on graph 13.

The block 16 represents a device having two control elements each of which has absolute control over the conduction through the device. Accordingly, when a signal having the waveform shown in graph 13 is applied to one control element and a signal having the waveform shown in graph 14*a* is applied to the other control element, conduction is established in the device during the intervals in successive lines represented by $t_3$ on graph 13 which fall within the large intervals in successive fields represented by $t_1$ on graph 14*a*, thereby developing in the output circuit of the device a series of pulses occurring over corresponding portions of successive lines falling within corresponding portions of successive fields.

The output signal from device 16 is applied through switch 17 to the aforementioned channel to modify certain of the lines of the applied television signal in a manner suggested by the graph 18 which includes a pulse 19 extending into the black region of the television signal.

The operation of the device 16 will be more fully appreciated by considering Fig. 2*a* which shows a television raster, i. e., the screen of the television receiver. The interval 21 in Fig. 2a represents the interval in certain of the horizontal lines falling within the interval 22 of successive fields during which the normal variations in the video signal are interrupted by the addition into the video signal forming this part of the television picture pulses corresponding to either black or white light level. The interval 21 corresponds to the interval $t_3$ on graph 13. The interval 22 corresponds to the interval $t_1$ on graph 14. Thus, it is readily apparent that the pulses developed in the output circuit of device 16 are adapted to produce an identification mark 20 on a television raster.

Fig. 2b is similar to Fig. 2a except that interval 21′ is made longer than interval 21 and interval 22′ is made shorter than interval 22 thereby producing a horizontal marker 20′ on the television raster. This effect may be obtained by making the time constant comprising capacitance 11 and resistance 12 longer than and the time constant comprising capacitance 14 and resistance 15 shorter than the time constants of these elements in the arrangement which develops the marker signal of Fig. 2a.

Fig. 2c is similar to Fig. 2a except that interval 21″ occurs progressively in successive lines to produce the oblique mark 20″. This effect may be obtained by progressively varying during field scansions the width of the square wave developed by generator 5.

The identification marks 20, 20′ and 20″ shown in Figs. 2a, 2b and 2c may be moved over the raster in order to identify the people or objects in the group being televised. In the system of Fig. 1 this is accomplished by means of potentiometers 23 and 24 which are connected respectively to the generator 5 and to the generator 8. The motion of the arm of the potentiometer 23 in one direction causes a change in the wave shape of the signal from the generator 5, and the motion of the arm of the potentiometer 23 in the other direction causes a change in the wave shape 6 in the other direction as suggested by the dotted lines on the waveform of graph 6. A change in the waveform shown in graph 6 causes a corresponding change in the position of the pulse 25 on graph 13 as suggested by the dotted pulses on this graph. Thus, the occurrence of the pulse 25, and hence the occurrence of pulse 19 on the graph 18, is controlled by the position of the control arm of potentiometer 23. Accordingly, it is readily seen that a movement of the control arm of potentiometer 23 will cause a lateral motion on the marker 20 on Fig. 2a. In a similar manner, the potentiometer 24 controls the vertical position of the marker 20.

The potentiometers 23 and 24 are preferably dual potentiometers mechanically interlinked so that motion of the control lever thereof in one direction will cause movement of the control arm of only one of the potentiometers and motion of the control lever in a direction perpendicular to the first direction will cause movement of the control arm of only the other of the potentiometers while motion of the control lever in a direction other than along the two axes defined by the above two directions will cause movements in the control arms of the potentiometers to a degree dependent on the projected components of the latter motion of the above-referred-to axes. With a dual potentiometer arrangement of this kind, the position of the identification marker in the television raster can be quickly and effectively moved to any part of the raster by moving a single lever in the desired direction.

The channel comprising video amplifier 1, video amplifier 2 and cathode follower stage 3 is preferably arranged to have a gain of unity so as not to disturb the normal operation of the television system into which the apparatus is inserted. Amplifier 1 has an amplification factor represented by the reciprocal of the amplification factor of cathode follower 3. Amplifier 2 is arranged to have a gain of unity. Video amplifier 2 functions as a phase inverting amplifier.

When switch 17 is in one position, a dark marker signal is introduced into the television signal channel. When the switch 17 is in the other position, a light marker signal is introduced into the channel. Thus, both light and dark objects may be pointed out in the reproduced picture.

Referring now to Fig. 3, there is shown a schematic diagram of the apparatus shown in block form in Fig. 1. Referring particularly to the upper left-hand corner of the drawing, there is shown an electron discharge device 26 having a cathode 27, a grid 28, and an anode 29. The cathode 27 is connected through a cathode biasing resistance 30 to ground; cathode 27 is bypassed to ground by capacitor 31. The grid 28 is connected through resistance 32 to ground. Grid 28 is also connected through coupling capacitor 33 to terminal 1a, corresponding to terminal 1a on Fig. 1. The anode 29 is connected through an anode load resistance 34 and decoupling resistance 34 to the positive terminal of the power supply. The junction of resistances 34 and 35 is by-passed to ground by capacitor 36.

The anode 29 is connected through a coupling capacitor 37 to the grid 38 of electron discharge device 39. The cathode 40 of electron discharge device 39 is connected through a cathode resistance 41 to ground. The anode 42 of electron discharge device 39 is connected through a load resistance 43 and a decoupling resistance 44 to the positive terminal of the power supply. The junction of resistances 43 and 44 is connected through a filter capacitor 45 to ground.

The anode 42 of electron discharge device 39 is connected to the anode of unilateral conducting device 46, the cathode of which is connected through coupling capacitor 47 and resistance 48 to grid 49 of electron discharge device 50. The grid 49 is connected through resistance 48 and grid resistance 51 to ground. The cathode 52 of electron discharge device 50 is connected through cathode resistance 53 to ground. The cathode 52 is also connected to terminal 3a which corresponds to terminal 3a on Fig. 1. The anode of electron discharge device 50 is connected through anode load resistance 55 to the positive terminal of the power supply.

The cathode of device 46 is connected through an inductance 56 and a resistance 57 to the movable contact arm of potentiometer 58, which is connected across the power supply. Capacitor 59 connected between the contact arm and ground functions as a filtering capacitor.

The circuit associated with electron discharge device 26 functions as a video amplifier and corresponds to video amplifier 1 of Fig. 1. The circuit associated with electron discharge device 39 functions as a video amplifier and corresponds to video amplifier 2 of Fig. 1. The circuit associated with electron discharge device 50 functions as a cathode follower stage and corresponds to cathode follower stage 3 in Fig. 1. Preferably the circuits associated with devices 26, 39 and 50 are shielded as suggested by the dotted line enclosing these devices.

Of course, the direct current component of the signal transmitted through amplifier 26 is removed by condenser 37. To restore this D.-C. component the channel comprising electron discharge devices 60, 61, 62 and 62a is provided. Device 60 has a cathode 63, a grid 64 and an anode 65. Cathode 60 is connected to ground. Grid 64 is connected through resistance 66 to ground. Grid 64 is also connected through capacitor 67 to a terminal 68 to which is applied the horizontal synchronizing signal of the composite television signal applied to the apparatus. The anode 65 is connected through a peaking inductance 69 and an anode load resistance 70 to the positive terminal of the power supply.

The electron discharge device 61 has a cathode 71, a control grid 72, and an anode 73. The cathode 71 is connected to ground through resistance 74. The control grid 72 is connected through capacitor 75 to anode 65 of device 60. The control grid 72 is also connected through resistance 75a to the positive terminal of the power supply. Capacitor 75 and resistance 75a form a differentiating network. The anode 73 is connected through anode load resistance 76 and decoupling resistance 77 to the positive terminal of the power supply. Capacitor 78 connected between the junction of resistance 76 and 77 is a filter capacitor.

The cathode 71 is connected through coupling capacitor 79 to the cathode 80 of unilaterally conducting device 62a. Cathode 80 is connected through resistance 81 to ground. The anode 82 of device 62a is connected to grid 38 of device 39.

The anode 73 is connected through capacitor 83 to anode 84 of unilaterally conducting device 62. The anode 84 is also connected through resistance 85 to ground. The cathode 86 of device 62 is connected to grid 38.

In the operation of the unidirectional component reinsertion or restoration circuit described in the preceding paragraphs, a negative horizontal synchronizing signal is applied between terminal 68 and ground. This signal is amplified by device 60 and applied to differentiating network comprising capacitor 75 and resistance 75a. The short pulses corresponding to the leading and lagging edges of the pulses of the horizontal synchronizing signal are developed across the resistance 75a and are applied to grid 72. The short pulses corresponding to the leading edges of the synchronizing signal pulses being of positive polarity have no effect on grid 72 since the latter grid is connected to B+ through resistance 75a. The short pulses corresponding to the trailing edges of the pulses of the synchronizing signal are amplified by device 61, cause short pulses of positive polarity to appear across anode load resistance 76, and short pulses of negative polarity and of substantially equal magnitude to appear across cathode resistance 71. These groups of pulses are applied to devices 62 and 72a, respectively, through coupling capacitors 83 and 79, respectively.

Since a short negative pulse is applied to cathode 80 and a short positive pulse is applied to anode 84, device 73 becomes conductive during the duration of the short pulses permitting current to flow in either direction between capacitor 37 and ground. The aforementioned short pulses occur during the blanking interval of the video signal applied at terminal 1a. Accordingly, the voltage developed across capacitor 37 is determined by the magnitude of the blanking voltage. After the occurrence of the aforementioned short pulses, the devices 62 and 62a become nonconductive due to the appearance of positive and negative voltages with respect to ground across resistances 117 and 118, respectively, caused by the discharging of capacitors 69a and 69b, which become charged during the application of the aforementioned short pulses. Thus, a unidirectional component of voltage depending on the magnitude of the blanking voltage appears across capacitor 37 and is added to the signal from the output of amplifier 26.

For further details as to the operation of the D.-C. reinsertion circuit of the kind described above, reference should be made to United States Patents Nos. 2,299,945 and 2,313,906 and to an article in the RCA Review of March 1948 by Mr. K. R. Wendt.

In the lower part of Fig. 3 is shown terminal 5a, corresponding to terminal 5a of Fig. 1, to which are applied the horizontal synchronizing pulses. Terminal 5a is connected through a coupling capacitor 87 to the grid 88 of electron discharge device 89. The grid 88 is also connected through grid resistance 90 to ground. The cathode 91 is connected to a suitable potential point 92 on a voltage divider comprising resistances 93 and 93a, connected across the power supply. The point 92 is by-passed to ground through by-pass capacitor 94. The anode 95 of device 89 is connected to the anode 96 of electron discharge device 97.

Electron discharge devices 97, 98, and 99 together form a generator of pulses corresponding to the generator 5 of Fig. 1. The cathode 100 of device 97 and the cathode 101 of device 99 are connected to one terminal of resistance 102, the other terminal of which is connected to ground. The grid 103 of device 97 is connected through series resistance 104 to the movable contact arm of voltage divider 105 which is connected across the power supply. The anode 96 is connected through anode load resistance 106 and through a parallel network of inductance 107 and resistance 108 to the positive terminal of the power supply. The anode 96 is also connected through a parallel network of resistance 109 and capacitor 110 to the grid 111 of device 98. The grid 111 is also connected through the grid resistance 112 to ground. The cathode 113 of device 98 is connected through resistance 114 to ground. The anode 115 of device 98 is connected to the positive terminal of the power supply. The cathode 113 is connected through capacitor 116 to the grid 117 of device 99. Grid 117 is also connected through resistance 118 to the positive terminal of the power supply. The anode 119 of device 99 is connected to the positive terminal of the power supply.

Cathode 100 is connected through capacitor 11 and resistance 12 to ground. Together the series combination of capacitor 11 and resistance 12, corresponding to capacitor 11 and resistance 12 of Fig. 1, form a differentiating network.

In the operation of the above-described circuit combination, the device 99 is normally conducting in the absence of a signal at the terminal 5a causing a bias to develop across cathode resistance 102, thereby rendering device 97 nonconductive, since its grid 103 is connected to a less positive potential than its cathode. On the appearance of a positive pulse at terminal 5a, the potential at anode 95 drops due to the conduction of current through anode resistance 106 of device 89. The drop in potential across resistance 106 is applied to grid 111 of cathode follower 98 through the parallel network comprising resistance 109 and capacitor 110, causing the potential of cathode 113 to drop. The drop in potential at cathode 113 is applied to grid 117 through a capacitor 116, thereby causing current conduction through device 99 to decrease. The decrease in conduction of current through device 99 causes a drop in potential across cathode resistance 102, thereby rendering device 97 conductive. Conduction through device 97 causes a further drop of potential across resistance 106, thereby accentuating the above-described action, until device 99 becomes non-conductive and device 97 becomes fully conductive. Device 99 becomes conductive again when the charge, developed across capacitor 116 while device 99 was in its conductive stage, decays to a predetermined value through resistance 118.

Thus, it is seen that the generator comprising devices 97, 98, 99 develops across the cathode resistance 102 a substantially square wave voltage of a periodicity determined by the periodicity of the synchronizing signal applied at terminal 5a. The width of the pulse obtained is determined by the bias voltage applied to grid 103 through the movable contact arm of potential divider 105. The parallel combination of inductance 107, resistance 108, and also the parallel combination of resistance 109 and capacitor 110, functions to improve the output waveform of the generator.

Referring now to the right center portion of Fig. 3, there is shown a terminal 8a corresponding to the terminal 8a of Fig. 1, and to which are applied pulses of a vertical synchronizing signal. The terminal 8a is connected through a capacitor 120 to the grid 121 of device 122. The grid 121 is also connected through grid resistance 123 to ground. Cathode 124 is connected to a positive potential point 125 on voltage divider 126 which is connected across the power supply. The point 125 is by-passed to ground by by-pass capacitor 126a. The anode 127 is connected to the anode 128 of device 129. Devices 129 and 130 comprise the circuit combination corresponding to block 8 of Fig. 1 for the generation of square wave voltage pulses. The cathode 131 of device 130 and the cathode 132 of device 129 are connected to one end of resistance 133, the other end of which is connected to ground. The grid 134 is connected to a positive potential point of voltage divider 135 which is connected across the power supply. The anode 128 of device 129 is connected through anode load resistance 136 to the positive terminal of the power supply. The anode 128 is also connected through capacitor 137 to grid 138 of device 130. The grid 138 is also connected through resistance 139 to the movable contact arm of voltage divider 140, which is connected across the power supply. The anode 141 of device 130 is connected to the positive terminal of the power supply.

Cathode 131 is connected through capacitor 14 and resistance 15 to ground. Together the series combination of capacitor 14 and resistance 15, corresponding to capacitor 14 and resistance 15 of Fig. 1, form a differentiating network.

With respect to the operation of the circuit just described, device 130 is normally conducting, since grid 138 is connected to a positive potential point, thereby developing across cathode resistance 133 a bias voltage sufficient to maintain device 129 non-conductive. Upon the appearance of a positive pulse at terminal 8a, the voltage drop across resistance 137 is increased due to conduction through device 122. This voltage drop is applied to grid 138 through capacitor 137, causing the conduction of device 130 to decrease. Reduction in conduction of device 130 causes a drop in potential across resistance 133. The drop in potential at cathode 132 causes a start of conduction through device 129, since the potential of cathode 132 is lowered with respect to grid 134. Conduction through device 129 causes a further drop in resistance 136 thereby accentuating the above-described action and resulting in device 130 becoming non-conductive and device 129 becoming fully conductive.

While device 130 was fully conductive, the capacitor 137 became charged to a positive potential, with the side connected to grid 138 being negative with respect to the other side. When this charge decays to a predetermined value through principally resistances 139 and 136, the device 130 again becomes conductive and the cycle of operation may be again repeated by the application of another pulse to terminal 8a. It is thus seen that the devices 129 and 130 develop a square wave voltage across the resistance 133 which is synchronized with the pulses applied to the terminal 8a. The width of the pulses developed across the resistance 133 is controlled by controlling the bias supplied to grid 138 through voltage divider 140.

In the center of the drawing is shown electron discharge device 142 having a cathode 143, a first control grid 144, screen grid 145, a second control grid 146, and anode 147. A voltage divider 148 for supplying operating potentials to the electron discharge device 142 is provided and comprises resistors 149, 150, 151, 152, connected in that order between the positive terminal of the power supply and ground. The cathode 143 is connected to the junction of resistances 151 and 152. The cathode 143 is also connected to a by-pass capacitor 153 to ground. The grid 144 is connected to the junction of resistance 12 and capacitor 11. The screen grid 145 is connected to the junction of resistances 151 and 150. The grid 146 is connected to the junction of resistance 15 and capacitor 14. The anode is connected through resistance 154 to the junction of resistances 150 and 149. The capacitor 155 by-passes this latter point on the voltage divider to ground.

Electron discharge device 142 has the characteristic that each of the control grids 144 and 146 has independent control over the conduction through the device. Unless proper potentials appear on these grids, no conduction is obtained through the device. Hence, only when the positive pulses of waveforms 13 and 14a in Fig. 1 appear at these respective grids simultaneously is conduction obtained through the device. The device 142 and its associated circuit corresponds to the block 16 on Fig. 1.

The anode 147 is connected through capacitor 155 to the arm of a double throw, single pole switch 156. One of the contactors of switch 156 is connected to the anode 42. The other contactor is connected to the anode 29. The arm of the switch 156 may be moved from one contact to the other by means of solenoid 157 connected across the power supply, through switch 158. Thus, it is seen that the voltage pulses developed in the anode circuit of device 142 may be added to the video signal applied at terminal 1A in either positive or negative phase, as pointed out in connection with the explanation of Fig. 1.

When the negative pulse signal from device 142 is added to a black positive video signal appearing across resistance 34, large negative peaks corresponding to the negative peaks of signal from device 142 appear in the resultant signal. These negative peaks drive grid 38 of device 39 negative with respect to cathode 40 and thereby cause a desired reduction in the amplitude of negative peaks in the resultant signal.

When the negative pulse signal from device 142 is added to a black negative video signal appearing across resistance 43, large negative peaks corresponding to the negative peaks of the signal from device 142 appear in the resultant signal. These negative peaks are reduced to a desired amplitude by the action of unilaterally conducting device 46. When the potential of anode 42 drops below the potential of movable contact arm of potentiometer 58 conduction through device 46 ceases. Accordingly, the negative potential excursions of anode 42 are limited to the potential at movable contact arm of potentiometer 58 and the negative peaks of the signal applied to grid 49 are limited to a desired value.

When a black negative video signal is applied between terminal 1a and ground, and the output of device 142 is applied to the output of device 26, a white marker signal is added to the video signal. When the output of device 142 is applied to the output of device 39 instead of device 26, a black marker signal is added to the video signal appearing in this channel.

Referring now again to the block diagram of Fig. 1, the signal applied at terminal 1A may be a composite television signal including a complete television signal, including the synchronizing signals, the blanking signals, and the video signals. The horizontal synchronizing signal and the vertical synchronizing signal which are applied at terminals 5A and 8A respectively may be obtained from the composite television signal by means of a sync stripper and sync separator, which are devices which separate the horizontal and vertical synchronizing signals from the composite television signal.

The channel comprising amplifiers 1, 2 and 3 may be inserted serially in any channel carrying video signals and where it is desired to insert a marker signal.

While I have shown a particular embodiment of my invention, it will of course be understood that I do not wish to be limited thereto, since many modifications both in the circuit arrangement and in the instrumentalities employed may be made, and I, therefore, contemplate by the appended claims to cover any such modifications as fall within the true spirit and scope of my invention.

What I claim as new and desire to secure by Letters Patent of the United States is:

1. The combination, in a television system in which an image is scanned line by line and field by field and in which a signal is produced varying with said image during said scanning and in which said image is reproduced line by line from said signal, of means to produce in said image as reproduced a desired indication having a definite pattern not present in said image as scanned, said means comprising means for developing a group of pulses each of which is synchronized with said line by line scanning, said pulses having an occurrence coincident with the occurrence of said line by line scanning of said pattern in said reproduced image, means for developing another group of pulses each of which is synchronized with said field by field scanning and each of which has a duration of several lines of said line by line scanning, the pulses of said other group having an occurrence coincident with the occurrence of said field by field scanning of said pattern in said reproduced image, means responsive to the coincidence of pulses from said one group with the pulses from said other group to develop a third group of pulses synchronized with said line by line scanning and field by field scanning, means for combining said third group of pulses with said signals, whereby those portions of said signals which represent the portions of successive lines which fall within said pattern are varied in accordance with said third group of pulses, the variations being such that said indication is produced in said image as reproduced, and means for varying the duration of each of the pulses of one of said first and second groups for varying the orientation of said indication on said reproduced image.

2. The combination, in a television system in which an image to be televised is synchronously scanned line by line and field by field and in which said image is synchronously reproduced line by line and field by field, of a transmission channel carrying signals varying in accord with said image, a first generator developing in the output circuit thereof substantially square waves having the periodicity of said line by line scanning, a second generator developing in the output circuit thereof substantially square waves having the periodicity of said field by field scanning, a first differentiating network and a second differentiating network having a substantially longer time constant than said first differentiating network, the output circuit of said first generator connected to the input circuit of said first differentiating network, the output circuit of said second generator connected to the input circuit of said second differentiating network, a device having a first and second input circuit and an output circuit and having the characteristic of developing a signal in the output circuit thereof only when signals of the same polarity are simultaneously applied to the input circuits thereof, each input circuit of said device being connected to the output circuit of a respective differentiating network to supply pulses of like polarity to said device, the output circuit of said device being connected to said transmission channel whereby pulses are produced in the signals of said transmission channel which cause modification in portions of said signals which represent successive lines, thereby an indicaton is produced by said pulses on said reproduced image.

3. The combination, in a television system in which an image to be televised is synchronously scanned line by line and field by field and in which said image is synchronously reproduced line by line and field by field, of a transmission channel carrying signals varying in accord with said image, a first generator developing in the output circuit thereof substantially square waves having the periodicity of said line by line scanning, a second generator developing in the output circuit thereof substantally square waves having the periodicity of said field by field scanning, a first differentiating network and a second differentiating network having a substantially longer time constant than said first differentiating network, the output circuit of said first generator connected to the input circuit of said first differentiating network, the output circuit of said second generator connected to the input circuit of said second differentiating network, means for combining the outputs of said differentiating networks and deriving therefrom pulses having an occurrence during the coincidence of the pulses obtained from said differentiating networks, means for applying said derived pulses to said transmission channel whereby pulses are produced in the signals of said transmission channel which cause modification in portions of said signals which represent successive lines, thereby an indication is produced by said pulses on said reproduced image.

References Cited in the file of this patent

UNITED STATES PATENTS

| | | |
|---|---|---|
| 2,403,975 | Graham | July 16, 1946 |
| 2,487,641 | Denk | Nov. 8, 1949 |
| 2,621,246 | Clayden et al. | Dec. 9, 1952 |